US008869180B2

(12) United States Patent  
Madison et al.

(10) Patent No.: US 8,869,180 B2  
(45) Date of Patent: Oct. 21, 2014

(54) ROTARY HEAD MULTI-LAYER DATA STORAGE AND RETRIEVAL SYSTEM AND METHOD

(71) Applicant: Oracle International Corporation, Redwood Shores, CA (US)

(72) Inventors: Carl T Madison, Windsor, CO (US); Timothy C Ostwald, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 13/685,823

(22) Filed: Nov. 27, 2012

(65) Prior Publication Data

US 2014/0146654 A1  May 29, 2014

(51) Int. Cl.
*G11B 7/003* (2006.01)
*G11B 15/18* (2006.01)
*G11B 21/04* (2006.01)
*G11B 15/61* (2006.01)
*G11B 5/29* (2006.01)

(52) U.S. Cl.
CPC ................................ *G11B 15/1833* (2013.01)
USPC ........ 720/672; 720/746; 360/84; 360/130.22; 360/70

(58) Field of Classification Search
CPC ...... G11B 7/003; G11B 7/24; G11B 7/24009; G11B 11/10502; G11B 13/00
USPC ..................... 360/70, 83–85, 130.21–130.24; 720/746, 672; 369/13.37, 13.39
See application file for complete search history.

(56) References Cited

U.S. PATENT DOCUMENTS

| | | | |
|---|---|---|---|
| 2,866,012 A | 12/1958 | Ginsburg et al. | |
| 5,331,490 A | 7/1994 | Richards et al. | |
| 5,450,228 A | 9/1995 | Boardman et al. | |
| 5,519,554 A | 5/1996 | Todd et al. | |
| 5,585,978 A | 12/1996 | Rottenburg et al. | |
| 5,617,391 A * | 4/1997 | Ono et al. | 369/44.18 |
| 5,674,583 A * | 10/1997 | Nakayama et al. | 428/64.4 |
| 5,748,600 A * | 5/1998 | Sugano et al. | 369/44.18 |
| 6,075,678 A | 6/2000 | Saliba | |
| 6,088,183 A | 7/2000 | Nelson | |

(Continued)

FOREIGN PATENT DOCUMENTS

| | | | |
|---|---|---|---|
| JP | 61063913 A * | 4/1986 | |
| JP | 63053726 A * | 3/1988 | |
| JP | 01062849 A * | 3/1989 | |
| JP | 2005011529 A * | 1/2005 | |

OTHER PUBLICATIONS

Quadruplex videotape, Wikipedia.org, Mar. 30, 2011, pp. 1-3.
Optical disc drive, Wikipedia.org, Mar. 30, 2011, pp. 1-4.

(Continued)

*Primary Examiner* — Will J Klimowicz
(74) *Attorney, Agent, or Firm* — Brooks Kushman P.C.

(57) ABSTRACT

A system and method for data storage and retrieval include a rotational head carriage unit having a plurality of heads. A tape drive unit moves a tape media length-wise across the head carriage unit while the head carriage unit rotates. The tape drive unit is adapted to use a tape comprising multiple recordable layers. The heads are adapted to read data from or write data to one recordable layer while rotating toward one edge of the tape media, and read data from or write data to another recordable layer while rotating toward the other edge of the tape media.

18 Claims, 3 Drawing Sheets

(56) References Cited

U.S. PATENT DOCUMENTS

| | | | |
|---|---|---|---|
| 6,297,927 B1 | 10/2001 | Rudi | |
| 6,304,397 B1 | 10/2001 | Ozue et al. | |
| 6,597,397 B1* | 7/2003 | Stephenson et al. | 348/231.99 |
| 6,614,731 B2 | 9/2003 | Ishii | |
| 7,133,262 B1 | 11/2006 | Nayak | |
| 8,225,339 B1* | 7/2012 | Madison et al. | 720/658 |
| 2009/0246712 A1* | 10/2009 | Sumioka | 430/321 |
| 2011/0318534 A1* | 12/2011 | Kim | 428/156 |

OTHER PUBLICATIONS

Helical scan, Wikepedia.org, Feb. 2, 2009, pp. 1-2.
Blu-ray disc, Wikipedia.org, Mar. 29, 2011, p. 1-10.

* cited by examiner

ROTARY HEAD MULTI-LAYER DATA STORAGE AND RETRIEVAL SYSTEM AND METHOD

TECHNICAL FIELD

This disclosure relates to a system and method for data storage and retrieval utilizing a multi-layer tape medium and a rotary head.

BACKGROUND

Typical tape data storage and retrieval methods involve recording or writing data in tracks running length-wise down the tape, as well as retrieving or reading such data tracks from the tape. A multiple stripe head may be used to write and/or read many parallel tracks. Magnetic read/write systems may simultaneously read or write 96 tracks or more, with the ability to jog along the width of a magnetic tape to write and/or read more tracks. Optical tape data storage and retrieval systems using laser heads may operate in a similar fashion.

Magnetic and optical tape media are frequently used for long-term storage of large quantities of data, such as in data backup or archive operations. However, multiple stripe head designs become inefficient as tape length is increased for greater capacity because of the increased time it takes to access the data stored at the end of the tape. Shorter tape lengths result in quicker access time than longer tape lengths, but also result in more limited data storage capacity. A wide tape to boost capacity requires many more transducers in the head. Data throughput is also a factor of tape width and the number of heads. Limits to multiple stripe head designs include the number of heads and overall tape width.

An improved data storage method involves the use of a rotary head where the tracks are written in width-wise arcs across the tape, such as the system disclosed in U.S. Pat. No. 8,225,339, for example. Such a method results in more tape surface area available for reading/writing data by the heads. It also permits the use of wider tapes to increase storage capacity with fewer heads than would be required using traditional stripe heads.

However, this method uses only 50% or less of the duty cycle of the rotating lasers. The lasers can access the tape for one half of the head rotation, but cannot write to the tape during the rest of the rotation without overwriting previously recorded tracks. This causes unnecessary wear and tear due to the unused portion of the duty cycle, and also limits the read/write speed of the system.

SUMMARY

A system and method for data storage and retrieval include a rotational head carriage unit having a plurality of heads. The system and method also include a tape drive unit which moves a tape media length-wise across the head carriage unit while the head carriage unit rotates. The tape drive unit is adapted to use a tape comprising multiple recordable layers. The heads are adapted to read data from or write data to one recordable layer while rotating toward one edge of the tape media, and read data from or write data to another recordable layer while rotating toward the other edge of the tape media.

In an embodiment of the system, the plurality of heads move along the width of the tape media in a direction substantially perpendicular to a length of the tape media as the head carriage unit rotates and the tape media moves laterally past the working surface of the head carriage unit in a direction substantially parallel to the length of the tape media. Each of the resultant plurality of data tracks recorded on the tape media has a generally arcuate shape. The plurality of data tracks read from or recorded to one layer is generally arcuate in the direction of motion of the tape media, and the plurality of tracks read from or recorded to the other layer is generally arcuate in the direction opposite the motion of the tape media. The tape media may be an optical tape, and the plurality of heads may be optical heads. The working surface of the head carriage unit may be narrower, wider, or equal in width to the width of the tape media. The tape media may also comprise more than two layers. If the tape media comprises, for example, four recordable layers, then the heads read data from or write data to the third and fourth layers in substantially the same pattern as with the first and second layers.

In another embodiment, a data storage and retrieval method comprises rotating a head carriage unit having a substantially planar working surface about an axis normal to the working surface. The working surface has a plurality of heads. The method also comprises moving a tape media across the working surface in a length-wise direction as the heads rotate, where the tape media comprises multiple recordable layers. The method further comprises reading data from or writing data to one recordable layer while rotating the plurality of heads toward one edge of the tape media, and reading data from or writing data to another recordable layer while rotating the plurality of heads toward the other edge of the tape media.

In one embodiment, the plurality of heads move along the width of the tape media in a direction substantially perpendicular to the length of the tape media as the head carriage unit rotates and the tape media moves laterally past the working surface of the head carriage unit in a direction substantially parallel to the length of the tape media. Each of the resultant plurality of data tracks recorded on the tape media has a generally arcuate shape that is somewhat skewed by linear movement of the tape relative to the rotating heads. Here again, the plurality of data tracks read from or recorded to one layer is generally arcuate in the direction of motion of the tape media, and the plurality of tracks read from or recorded to the other layer is generally arcuate in the direction opposite the motion of the tape media. The tape media may be an optical tape, and the plurality of heads may be optical heads. The working surface of the head carriage unit may be narrower, wider, or equal in width to the width of the tape media. The tape media may also comprise more than two layers. If the tape media comprises, for example, four recordable layers, then the heads read data from or write data to the third and fourth layers in substantially the same pattern as with the first and second layers.

Embodiments according to the present disclosure provide a number of advantages. For example, the present disclosure provides a data storage system that can read and write at a higher speed than a single-layer rotational head data storage system by making use of a fuller range of rotation of the carriage head unit. Furthermore, by using a tape media with more than one recordable layer, the data storage density of the system is increased.

The above advantages and other advantages and features of the present disclosure will be readily apparent from the following detailed description when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-5, a data storage and retrieval system and method utilizing a rotary head and a tape media having multiple recordable layers will be described. For ease of illustration and to facilitate understanding, like reference numerals have been used herein for similar components and features throughout the drawings.

As those of ordinary skill in the art will understand, various features of the present invention as illustrated and described with reference to any of the Figures may be combined with features illustrated in one or more other Figures to produce embodiments of the preset disclosure that are not explicitly illustrated or described. The combinations of features illustrated provide representative embodiments for typical applications. However, various combinations and modifications of the features consistent with the teachings of the present disclosure may be desired for particular applications or implementations.

As previously described, a prior art tape media data storage system and method include a rotary head design that facilitates use of more tape surface using rotating read/write heads. The wide tape media provides greater tape surface area for a read/write head, and achieves both high data capacity and fast access times. Multiple heads may be assembled to a rotating head mechanism to write and/or read multiple tracks in approximate arcs on the tape. This data storage system and method allows for a large tape surface in proximity to many high speed heads. However, the heads can read from or write to the tape media for at most one half rotation of the head mechanism. Otherwise, heads would overwrite previously written tracks. As a result, at least 50% of the heads' duty cycle is unused.

As described herein, an improved tape media data storage system and method includes a tape drive adapted to use a tape having multiple recordable layers. The multiple recordable layers may be implemented by a generally uniform single physical layer of recordable media deposited on a substrate and having a sufficient thickness to record data at first and second depths relative to the substrate or media surface. Alternatively, the two or more recordable layers may be physically discrete layers of the same or a different recordable medium deposited on a substrate. Different layers may have different material properties to facilitate multi-layer recording depending upon the particular application and implementation. According to one embodiment, the tape drive moves a tape comprising at least two recordable layers across a rotating head mechanism. As the head mechanism rotates, the heads disposed on the mechanism read from or write to the tape media. The heads read data from or write data to one layer of the tape while rotating towards one edge of the tape media, and read data from or write data to another layer of the tape while rotating towards the other edge of the tape media during a single revolution of the head mechanism. In one embodiment, the first and second layers correspond to first and second depths relative to the surface of the recording medium with the recording medium comprising a generally uniform write-once, read-many (WORM) type phase change medium.

Figure 1:
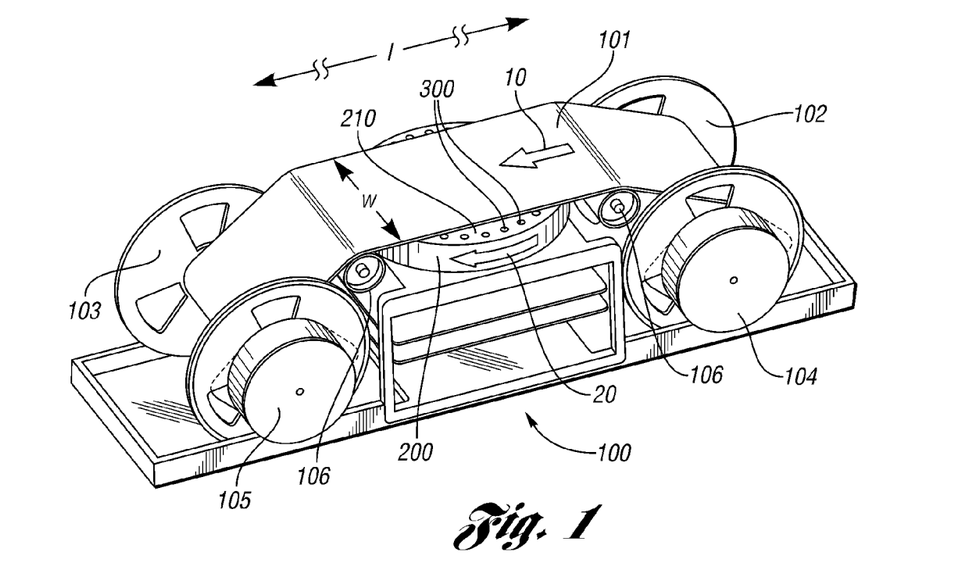
FIG. 1 illustrates a perspective view of an embodiment of a data storage and retrieval system according to the present disclosure.

Referring now to FIG. 1, a perspective view of one embodiment illustrating operation of a data storage and retrieval system or method according to the present disclosure is shown. A tape drive system such as that shown in FIG. 1 comprises tape driving components and a head assembly. In that regard, the embodiment depicted in FIG. 1 can be described by detailing the main components in the two functional areas.

More specifically, the tape driving components in FIG. 1 comprise a tape media 101, which may be an optical tape, having at least two recordable layers and the supporting servo drive system 100. The tape media 101 may be supplied on a supply reel 102 and can be transferred to a take-up reel 103 by servo action of a supply reel drive motor 104 and take-up reel drive motor 105. The two motors 104, 105 may act in unison to provide smooth movement of the tape 101 along the tape path and move the tape in a generally linear fashion to position the tape during loading and/or unloading as well as during reading and/or writing of data.

As can be seen in FIG. 1, the tape media 101 has a width w, as well as a length l stretching from respective ends of the tape 101, which ends are attached to the supply and take-up reels 102, 103. The tape 101 travels in a direction shown by arrow 10 along a tape path. The direction may be reversed during operation depending on the particular application and implementation. The tape path has a series of guide rollers 106, which help to provide control of the tape 101 as it is driven past a head assembly 200. A servo control system (not shown) may be used to provide closed loop motion control for the tape 101 and accurately control the tape tension and position with respect to the head assembly 200.

As also seen in FIG. 1, the head assembly 200 may be substantially disc-shaped, including a substantially circular and substantially planar working surface 210 proximate the tape media 101. The head assembly 200 may include multiple heads 300 for recording and/or reading data to and/or from tape media 101. In that regard, the head assembly 200 rotates during operation in a direction shown by arrow 20. Unlike the linear tape direction represented by arrow 10 that may change direction during operation, head assembly 200 generally rotates in the same direction during operation although the direction of rotation may be counter-clockwise rather than clockwise in some applications.

Figure 2:
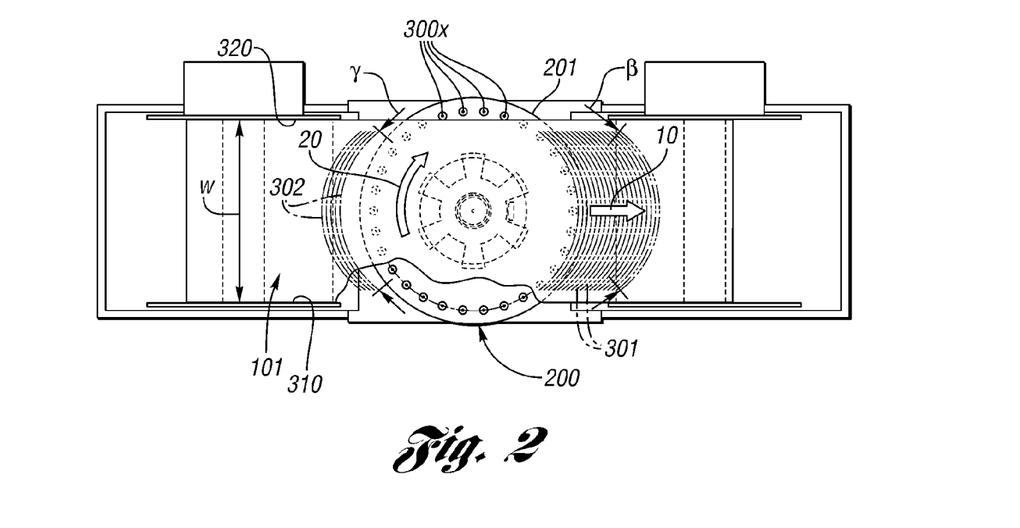
FIG. 2 illustrates a top view of an embodiment of a data storage and retrieval system according to the present disclosure.

Referring next to FIG. 2, a top view of a data storage and retrieval system with a rotating head is shown. In particular, the head assembly 200 is illustrated therein. The surface of the head assembly 200 holds multiple Optical Pickup Unit (OPU) laser assemblies 300*x* located circumferentially and/or radially on the surface of the head assembly 200. As tape media 101 moves in the direction indicated by arrow 10, head assembly 200 rotates in the direction indicated by arrow 20 and OPU laser assemblies 300 may record or read a plurality of data tracks in substantially similar arcs 301 on the tape. As those of ordinary skill in the art will recognize, the shape of the arcs may be slightly skewed by the linear movement of tape 101 during rotation of head assembly 200 with the actual geometry determined by the rotational speed of head assembly 200 relative to the linear speed of optical tape 101. Likewise, the geometry or shape of the tracks will be affected by the radial or diametrical spacing of OPU laser assemblies 300 relative to width w of tape 101. The OPU laser assemblies 300 record or read data tracks along arcs of β degrees while the head assembly 200 rotates, where β≤180 degrees. In various prior art implementations, the read/write process was limited to this portion of the head rotation. During the remaining 360–β degrees of head assembly rotation, the OPU laser assemblies 300 of prior art implementations cannot read or write data without overwriting successive tracks.

In contrast to prior art implementations, the embodiment of a data storage and retrieval system or method as disclosed herein and shown in FIG. 2 can read/write data in generally arcuate tracks 301 in addition to oppositely oriented generally arcuate tracks 302. In particular, while the head assembly 200 rotates toward one edge 310 of the tape media 101, the OPU laser assemblies 300 may record or read first layer data tracks 301 on one layer 330 (FIG. 4) of the tape media 101. The first layer data tracks 301 are recorded or read along arcs of β degrees, where β≤180 degrees. As the head assembly 200 rotates toward the other edge 320 of the tape media 101, the OPU laser assemblies 300 may record or read second layer data tracks 302 from a second layer 340 (FIG. 4) of the tape media 101. The second layer data tracks 302 are recorded or read along arcs of γ degrees, where 180≤γ≤360 degrees.

Still referring to FIG. 2, the tape media 101 may have a width w that is substantially equal to the diameter of the working surface 201. Alternatively, the tape media 101 may have a width w that is less than the diameter of the working surface 201, or that is greater than the diameter of the working surface 201. Additionally, the reading or writing of first layer data tracks 301 and the reading or writing of data of the second layer data tracks 302 may occur during a single 360 degree rotation of the head assembly 200 in one embodiment. The tape media 101 may also have more than two recordable layers. For example, the tape media 101 may include recordable media that is thick enough to accommodate recording at four different depths or layers. In such an embodiment, the heads 300 are adapted to read or write data on the third recordable layer (not shown) as the head assembly 200 rotates toward the first edge of the tape media 101 and to read or write data on the fourth recordable layer not shown as the head assembly 200 rotates toward the second edge of the tape media 101. Of course, other reading/writing strategies may be used depending on the particular application and implementation.

As generally understood by those of ordinary skill in the art, a single OPU laser assembly may write to or read from more than one layer or depth of tape media 101. For example, an OPU laser assembly may read/write data in tracks 301 on a first layer 330, and then optical controls may be used to refocus the laser to read/write data in tracks 302 on a second layer 340. In an alternative configuration, the different layers of tape media 101 may be sensitive to different frequency ranges of the light used to read/write the data. As such, a different frequency (wavelength) of light may be used to read/write data in tracks 301 on a first layer 330 relative to the frequency (wavelength) of light used to read/write data in tracks 302 on a second layer 340. Multiple OPUs may be used to provide the associated light frequency. Alternatively, the light frequency may be shifted using various other techniques. Likewise, head assembly 200 may include a first number or set of OPUs that read/write data to a first layer of tape media 101 and a second number or set of OPUs that read/write data to a second layer of tape media 101 with the first and second sets of OPUs arranged in groups, alternating, or various other patterns, for example.

Various embodiments may include reading/writing a plurality of data tracks 301 prior to reading/writing data tracks 302, i.e. where tracks 301 and 302 are not both accessed during a single revolution of the head.

Figure 3:
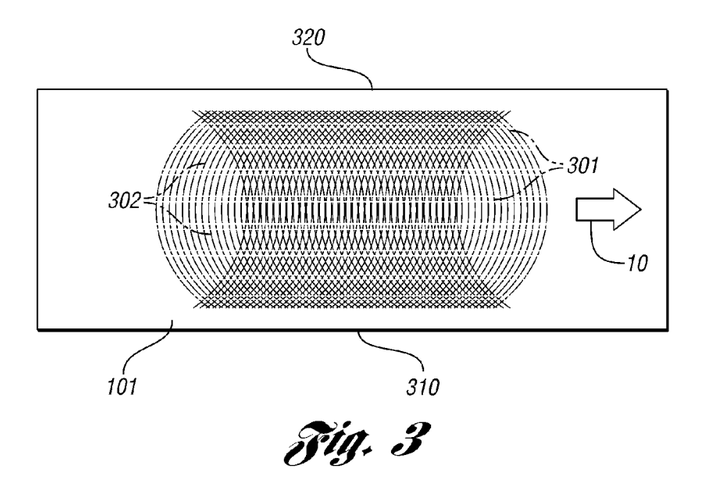
FIG. 3 illustrates a top view of the resulting data tracks recorded on a multi-layer tape using an embodiment of a data storage and retrieval system or method according to the present disclosure.
Figure 4:
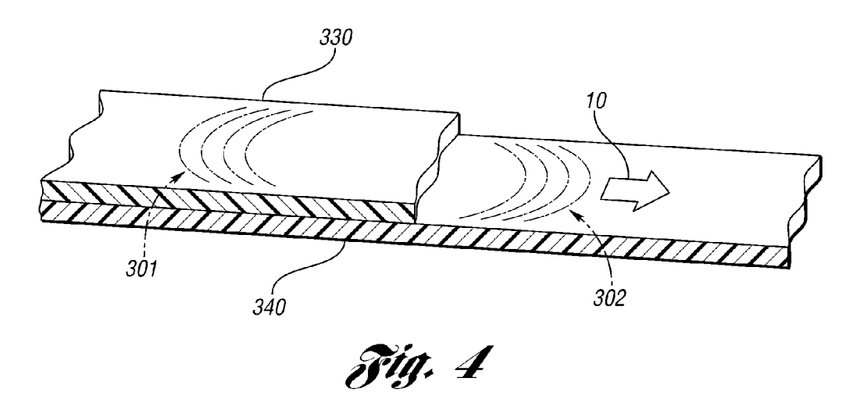
FIG. 4 is an alternative illustration of data tracks recorded on a multi-layer tape using an embodiment of the present disclosure.

Referring next to FIGS. 3 and 4, a top view and enlarged perspective view, respectively, of a tape media 101 that may be used in an embodiment of the data storage and retrieval system disclosed herein is shown. In particular, a superimposition of the two recordable data layers 330, 340 and a number of the plurality of first layer data tracks 301 and second layer data tracks 302 are shown. The first layer data tracks 301 and second layer data tracks 302 are generally arcuate and substantially similar in shape. The first layer data tracks 301 are generally arcuate in the direction of tape motion 10, while the second layer data tracks 302 are generally arcuate in the direction opposite that of tape motion 10.

Figure 5:
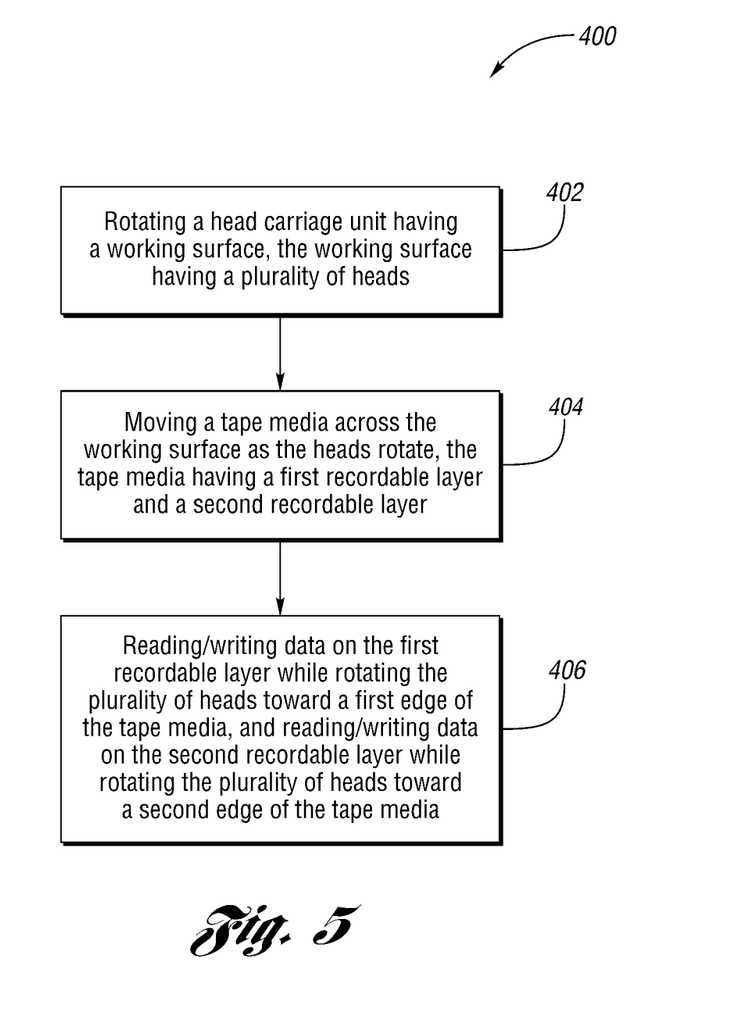
FIG. 5 is a simplified flowchart depicting operation of an embodiment of a data storage and retrieval system or method according to the present disclosure.

Referring next to FIG. 5, a simplified flowchart illustrating operation of a data storage and retrieval system or method according to embodiments of the present disclosure is shown. As those of ordinary skill in the art will understand, the functions represented in FIG. 5 may be performed by software and/or hardware depending on the particular application and implementation. The various functions may be performed in an order or sequence other than illustrated in FIG. 5 depending upon the particular processing strategy. Similarly, one or more functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of associated hardware, such as rotation of the head carriage assembly 200, OPUs 300x, and servo motors associated with movement and positioning of tape 101.

As generally shown in FIG. 5, data storage/retrieval strategy 400 comprises rotating 402 a head carriage unit having a substantially planar working surface about an axis normal to the working surface, the working surface having a plurality of heads. The method further comprises moving 404 a linear tape media along its length across the working surface in a direction parallel to a length of the tape media as the heads rotate, the tape media having a first edge, a second edge, a first recordable layer, and a second recordable layer. The method still further comprises reading data from or writing data to the first recordable layer while rotating the plurality of heads toward the first edge of the tape media, and reading data from or writing data to the second recordable layer while rotating the plurality of heads toward the second edge of the tape media.

Once again, as described previously in connection with FIGS. 1-5, according to an embodiment of the data storage method disclosed herein, the plurality of heads may move along the width of the tape media in a direction substantially perpendicular to the length of the tape media as the head carriage unit rotates and the tape media moves laterally past the working surface of the head carriage unit in a direction substantially parallel to the length of the tape media. Those of ordinary skill in the art will recognize that the data tracks will be closer to perpendicular as the ratio of the head carriage unit diameter to the tape width increases and will be more arcuate for smaller head carriage unit diameters relative to the tape width. As a result, each of the plurality of data tracks recorded on the tape media may have an arcuate shape. Because the heads read/write from/to one layer of the tape media while rotating toward one edge of the tape media and read/write from/to a second layer of the tape media while rotating toward another edge of the tape media, the first layer data tracks are generally arcuate in the direction of motion of the tape media, and the plurality of data tracks recorded to the second recordable layer is arcuate in the direction opposite the motion of the tape media. Furthermore, the reading or writing of data on the first layer of the tape media and the reading or writing of data on the second layer of the tape media may occur during a single rotation of the head carriage unit.

As also described above in connection with FIGS. 1-5, according to the data storage method disclosed herein, the head carriage unit may be substantially disc shaped and the working surface may be substantially circular. As well, the tape media may be an optical tape, and the plurality of heads disposed at the working surface may comprise a plurality of optical heads. Still further, the tape media width may be substantially equal to the diameter of the working surface, less than the diameter of the working surface, or greater than the diameter of the working surface. Additionally, as described above, the tape media may have more than two recordable layers. For example, the tape media may comprise four recordable layers. In such an embodiment, the heads read or write data on the third recordable layer as the head assembly rotates toward the first edge of the tape media and to read or write data on the fourth recordable layer as the head assembly rotates toward the second edge of the tape media.

As can be seen from the various embodiments, the present invention provides various advantages relative to prior art implementations. For example, a data storage system or method according to the present disclosure can read and write data at a higher speed than a single-layer rotational head data storage system or method by making use of a fuller range of rotation of the carriage head unit. Furthermore, by using a tape media with more than one recordable layer, the data storage density of the system is increased.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A data storage and retrieval system comprising:
   a head carriage unit having a substantially planar working surface with a plurality of heads, the head carriage unit adapted for rotation about an axis normal to the working surface; and
   a tape drive unit adapted to move a tape media across the working surface in a direction parallel to a length of the tape media as the head carriage unit rotates, the tape media having a first edge, a second edge, a first recordable layer and a second recordable layer;
   wherein the plurality of heads read data from or write data to the first recordable layer while rotating toward the first edge of the tape media, and read data from or write data to the second recordable layer while rotating toward the second edge of the tape media.

2. The system of claim 1 wherein the data read from or written to the tape media comprise a plurality of data tracks, and the plurality of data tracks recorded to or read from the first recordable layer is generally arcuate in the direction of motion of the tape media, and the plurality of data tracks recorded to or read from the second recordable layer is generally arcuate in the direction opposite the motion of the tape media.

3. The system of claim 1, wherein the tape media comprises an optical tape.

4. The system of claim 3, wherein the plurality of heads comprises a plurality of optical heads.

5. The system of claim 1, wherein the plurality of heads read data from or write data to the first recordable layer and read data from or write data to the second recordable layer during a single rotation of the head carriage unit.

6. The system of claim 1, wherein the working surface is circular and a diameter of the working surface is equal to a width of the tape media.

7. The system of claim 1, wherein the working surface is circular and a diameter of the working surface is less than a width of the tape media.

8. The system of claim 1, wherein the working surface is circular and a diameter of the working surface is greater than a width of the tape media.

9. The system of claim 1, wherein the tape media further comprises a third recordable layer and a fourth recordable layer, and wherein the plurality of heads read data from or write data to the third recordable layer while rotating toward the first edge of the tape media, and read data from or write data to the fourth recordable layer while rotating toward the second edge of the tape media.

10. A data storage and retrieval method comprising:
    rotating a head carriage unit having a substantially planar working surface about an axis normal to the working surface, the working surface having a plurality of heads;
    moving a tape media across the working surface in a direction parallel to a length of the tape media as the heads rotate, the tape media having a first edge, a second edge, a first recordable layer, and a second recordable layer; and
    reading data from or writing data to the first recordable layer while rotating the plurality of heads toward the first edge of the tape media, and reading data from or writing data to the second recordable layer while rotating the plurality of heads toward the second edge of the tape media.

11. The method of claim 10 wherein the data read from or written to the tape media comprise a plurality of data tracks, and the plurality of data tracks recorded to or read from the first recordable layer is arcuate in the direction of motion of the tape media, and the plurality of data tracks recorded to or read from the second recordable layer is arcuate in the direction opposite the motion of the tape media.

12. The method of claim 10, wherein the tape media comprises an optical tape.

13. The method of claim 12, wherein the plurality of heads comprises a plurality of optical heads.

14. The method of claim 10, wherein reading data from or writing data to the first recordable layer and reading data from or writing data to the second recordable layer occur during a single rotation of the head carriage unit.

15. The method of claim 10, wherein the working surface is circular and a diameter of the working surface is equal to a diameter of the tape media.

16. The method of claim 10, wherein the working surface is circular and a diameter of the working surface is less than a diameter of the tape media.

17. The method of claim 10, wherein the working surface is circular and a diameter of the working surface is greater than a diameter of the tape media.

18. The method of claim 10, wherein the tape media further comprises a third recordable layer and a fourth recordable layer, and wherein the method further comprises reading data from or writing data to the third recordable layer while rotating the plurality of heads toward the first edge of the tape media, and reading data from or writing data to the fourth recordable layer while rotating the plurality of heads toward the second edge of the tape media.

* * * * *

UNITED STATES PATENT AND TRADEMARK OFFICE
CERTIFICATE OF CORRECTION

| | | |
|---|---|---|
| PATENT NO. | : 8,869,180 B2 | Page 1 of 1 |
| APPLICATION NO. | : 13/685823 | |
| DATED | : October 21, 2014 | |
| INVENTOR(S) | : Madison et al. | |

It is certified that error appears in the above-identified patent and that said Letters Patent is hereby corrected as shown below:

On The Title Page, item (56)

On page 2, column 2, under Other Publications, line 1, delete "Wikepedia.org," and insert -- Wikipedia.org, --, therefor.

Signed and Sealed this
Twenty-third Day of June, 2015

Michelle K. Lee
*Director of the United States Patent and Trademark Office*